US009858763B2

(12) United States Patent
Chen et al.

(10) Patent No.: US 9,858,763 B2
(45) Date of Patent: Jan. 2, 2018

(54) METHOD OF GAMING, A GAMING SYSTEM AND A GAME CONTROLLER

(71) Applicant: ARISTOCRAT TECHNOLOGIES AUSTRALIA PTY LIMITED, North Ryde, NSW (AU)

(72) Inventors: Yonghong Chen, Villawood (AU); David Villa, Cronulla (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 67 days.

(21) Appl. No.: 15/066,224

(22) Filed: Mar. 10, 2016

(65) Prior Publication Data

US 2016/0267742 A1 Sep. 15, 2016

(30) Foreign Application Priority Data

Mar. 10, 2015 (AU) ................................ 2015900845

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3267* (2013.01); *G07F 17/326* (2013.01); *G07F 17/3223* (2013.01); *G07F 17/3225* (2013.01)

(58) Field of Classification Search

None

See application file for complete search history.

(56) References Cited

U.S. PATENT DOCUMENTS

| | | | |
|---|---|---|---|
| 4,188,035 | A | 2/1980 | Metzler, Jr. |
| 4,883,277 | A | 11/1989 | Laisure |
| 6,910,963 | B1 | 6/2005 | Ohtsu et al. |
| 2001/0053712 | A1 | 12/2001 | Yoseloff et al. |
| 2003/0116916 | A1 | 6/2003 | Cherry |
| 2003/0132576 | A1 | 7/2003 | Stancik |
| 2004/0023714 | A1 | 2/2004 | Asdale et al. |
| 2005/0140092 | A1 | 6/2005 | Solano |

(Continued)

FOREIGN PATENT DOCUMENTS

| | | | |
|---|---|---|---|
| AU | 2011239227 | A1 | 11/2011 |
| AU | 2012202530 | A1 | 5/2012 |

(Continued)

*Primary Examiner* — Kevin Y Kim

(74) *Attorney, Agent, or Firm* — Armstrong Teasdale LLP

(57) ABSTRACT

A method of gaming includes conducting game rounds until an end condition is met, wherein each game round includes selecting symbols from a set of game symbols using a random number generator. The selected symbols are displayed on a display, and if they include one or more of a set of first symbols of the game symbols, a corresponding first symbol for each included first symbol is added to a first symbol display area. If the selected symbols include a second symbol, all occurrences of at least one first symbol are then removed from the first symbol area. The method also includes determining if a first end condition is met when the combined total of first symbols in the first symbol display area reaches a defined number, or if a second end condition is met when all occurrences of at least one first symbol are removed from the first symbol area results in no first symbols being in the first symbol area.

23 Claims, 7 Drawing Sheets

(56) References Cited

U.S. PATENT DOCUMENTS

| | | | |
|---|---|---|---|
| 2010/0075736 | A1 | 3/2010 | Muir et al. |
| 2012/0190428 | A1 | 7/2012 | Wadleigh et al. |
| 2013/0045787 | A1 | 2/2013 | Vallejo et al. |
| 2013/0324216 | A1 | 12/2013 | Evans |
| 2014/0100015 | A1 | 4/2014 | Roukis |
| 2014/0123464 | A1 | 5/2014 | Martineck, Sr. |
| 2014/0335933 | A1 | 11/2014 | Robbins et al. |

FOREIGN PATENT DOCUMENTS

| | | | |
|---|---|---|---|
| AU | 2012261621 | A1 | 6/2013 |
| AU | 2014201484 | A1 | 10/2014 |
| CA | 2562327 | A1 | 11/2007 |
| CN | 1455533 | A | 11/2003 |
| CN | 101925103 | A | 12/2010 |
| CN | 102404841 | A | 4/2012 |
| GB | 191346 | A | 1/1923 |
| GB | 408975 | A | 4/1934 |
| GB | 444588 | A | 3/1936 |
| GB | 464340 | A | 4/1937 |
| GB | 668507 | A | 3/1952 |
| GB | 684799 | A | 12/1952 |
| GB | 713695 | A | 8/1954 |
| GB | 718717 | A | 11/1954 |
| GB | 749504 | A | 5/1956 |
| GB | 945344 | A | 12/1963 |
| GB | 1007425 | A | 10/1965 |
| GB | 1076166 | A | 7/1967 |
| GB | 1149765 | A | 4/1969 |
| GB | 1274603 | A | 5/1972 |
| GB | 1518591 | A | 7/1978 |
| GB | 2202754 | A | 10/1988 |
| GB | 2258620 | A | 2/1993 |
| GB | 2299278 | A | 10/1996 |
| JP | 2005065824 | A | 3/2005 |
| JP | 2009219110 | A | 9/2009 |
| JP | 2011235137 | A | 11/2011 |
| RU | 2104728 | C1 | 2/1998 |
| RU | 2007125784 | A | 1/2009 |
| WO | 03047708 | A1 | 6/2003 |
| WO | 2006039712 | A1 | 4/2006 |

METHOD OF GAMING, A GAMING SYSTEM AND A GAME CONTROLLER

CROSS REFERENCE TO RELATED APPLICATIONS

This application claims priority to AU Provisional Patent Application No. 2015900845 filed Mar. 10, 2015 for "A METHOD OF GAMING, A GAMING SYSTEM AND A GAME CONTROLLER", which is hereby incorporated by reference in its entirety.

FIELD

The present invention relates to a method of gaming, a gaming system and a game controller.

BACKGROUND

Gaming machines are known where a player can collect symbols as part of the game play A need exists for alternative gaming systems.

SUMMARY

In a first aspect, the invention provides an electronic method of gaming comprising; upon a start condition being met, conducting game rounds with a game controller of a gaming system until an end condition is met, wherein each game round comprises: the game controller selecting symbols from a set of game symbols using a random number generator, the selected symbols being displayed on a display of a gaming system; upon the selected symbols including one or more of a set of first symbols of the game symbols, adding a corresponding first symbol for each included first symbol to a first symbol display area on the display; upon the selected symbols including a second symbol of the game symbols, removing all occurrences of at least one first symbol from the first symbol area; determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and making an award in response to the second end condition being met.

In an embodiment, the selected symbols are displayed in a plurality of columns of display positions.

In an embodiment, a ranking is assigned to respective first symbols of the set of first symbols, and removing all occurrences of at least one first symbol comprises removing all occurrences of at least a lowest ranked symbol.

In an embodiment, any first symbols are added to first symbol display area before any first symbol is removed, and wherein it is determined whether the first end condition is met before any first symbol is removed.

In an embodiment, the method comprises making an award upon all occurrences of a symbol being removed, wherein the value of the award is dependent on the number of symbols removed.

In an embodiment, the method comprises displaying the first symbol display area and adding a defined number of first symbols to the first symbol display area in response to the start condition being met.

In an embodiment, the start condition is that a trigger condition is met in a based game implemented by the game controller.

In a second aspect, the invention provides a game controller for a gaming system, the game controller configured to: upon a start condition being met, conduct game rounds until an end condition is met, wherein each game round comprises; selecting symbols from a set of game symbols using a random number generator, the selected symbols being selected for display on a display of a gaming system; upon the selected symbols including one or more of a set of first symbols of the game symbols, controlling the display to add a corresponding first symbol for each included first symbol to a first symbol display area on the display; upon the selected symbols including a second symbol of the game symbols, removing all occurrences of at least one first symbol from the first symbol area; determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and making an award in response to the second end condition being met.

In an embodiment, the game controller is further configured to control the display to display the selected symbols in a plurality of columns of display positions.

In an embodiment, a ranking is assigned to respective first symbols of the set of first symbols, and wherein the game controller is further configured to remove all occurrences of at least one first symbol by removing all occurrences of at least a lowest ranked symbol.

In an embodiment, the game controller is further configured to add any first symbols to the first symbol display area before any first symbol is removed, and wherein the game controller is configured to determine whether the first end condition is met before any first symbol is removed.

In an embodiment, the game controller is further configured to make an award upon all occurrences of a symbol being removed, wherein the value of the award is dependent on the number of symbols removed.

In an embodiment, the game controller is further configured to display the first symbol display area and add a defined number of first symbols to the first symbol display area in response to the start condition being met.

In an embodiment, the start condition is that a trigger condition is met in a base game implemented by the game controller.

In a third aspect, the invention provides a gaming system configured to, upon a start condition being met, conduct game rounds until an end condition is met, the gaming system comprising: a display; a symbol selector for selecting symbols in each game round from a set of game symbols using a random number generator for display on the display; a first symbol display adjustor for: upon the selected symbols including one or more of a set of first symbols of the game symbols, controlling the display to add a corresponding first symbol for each included first symbol to a first symbol display area on the display; and upon the selected symbols including a second symbol of the game symbols, removing all occurrences of at least one first symbol from the first symbol area; an end condition monitor for determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and an outcome evaluator for making an award in response to the second end condition being met.

In an embodiment, the selected symbols are displayed in a plurality of columns of display positions.

In an embodiment, a ranking is assigned to respective first symbols of the set of first symbols, and the first symbol display adjustor is further configured to remove all occurrences of at least one first symbol by removing all occurrences of at least a lowest ranked symbol.

In an embodiment, the first symbol display adjustor is further configured to add any first symbols to the first symbol display area before any first symbol is removed, and the end condition monitor is configured to determine whether the first end condition is met before any first symbol is removed.

In an embodiment, the outcome evaluator is further configured to make an award upon all occurrences of a symbol being removed, wherein the value of the award is dependent on the number of symbols removed.

In an embodiment, the gaming system comprises a display controller configured to display the first symbol display area and wherein the first symbol display adjustor is configured add a defined number of first symbols to the first symbol display area in response to the start condition being met.

In an embodiment, the start condition is that a trigger condition is met in a base game implemented by the gaming system.

In a fourth aspect, the invention provides a gaming system comprising: display means; means for, upon a start condition being met, conducting game rounds with a game controller of a gaming system until an end condition is met; means for selecting symbols from a set of game symbols for each game round using a random number generator, the selected symbols being displayed on a display of a gaming system; means for upon the selected symbols including one or more of a set of first symbols of the game symbols, adding a corresponding first symbol for each included first symbol to a first symbol display area on the display; means for upon the selected symbols including a second symbol of the game symbols, removing all occurrences of at least one first symbol from the first symbol area; means for determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and means for making an award in response to the second end condition being met.

In a fifth aspect, the invention provides an electronic method of gaming comprising: upon a start condition being met, conducting game rounds with a game controller of a gaming system until an end condition is met, wherein each game round comprises the game controller: selecting symbols from a set of game symbols using a random number generator, the selected symbols being displayed on a display of the gaming system; evaluating the selected symbols in order to determine whether to alter one or more of a plurality of counters maintained by the gaming system, wherein each counter is associated with at least one of a set of first symbols of the set of game symbols, the evaluation being performed by: increasing each counter by the number of first symbols associated with the respective counter contained in the selected symbols; and resetting at least one counter of the plurality of counters to zero upon at least one second symbol being contained in the selected symbols; determining whether a first end condition or a second end condition is met, the first end condition being that a combined total of the counters reaches a first defined number, and the second end condition being that resetting the at least one counter to zero results in the combined total of the counters being zero; and making an award in response to the second end condition being met.

In a sixth aspect, the invention provides computer program code which when executed implements the above method.

In a seventh aspect, the invention provides a tangible computer readable medium comprising the above program code.

BRIEF DESCRIPTION OF DRAWINGS

An exemplary embodiment of the invention will now be described with reference to the accompanying drawings in which.

DETAILED DESCRIPTION

Figure 1:
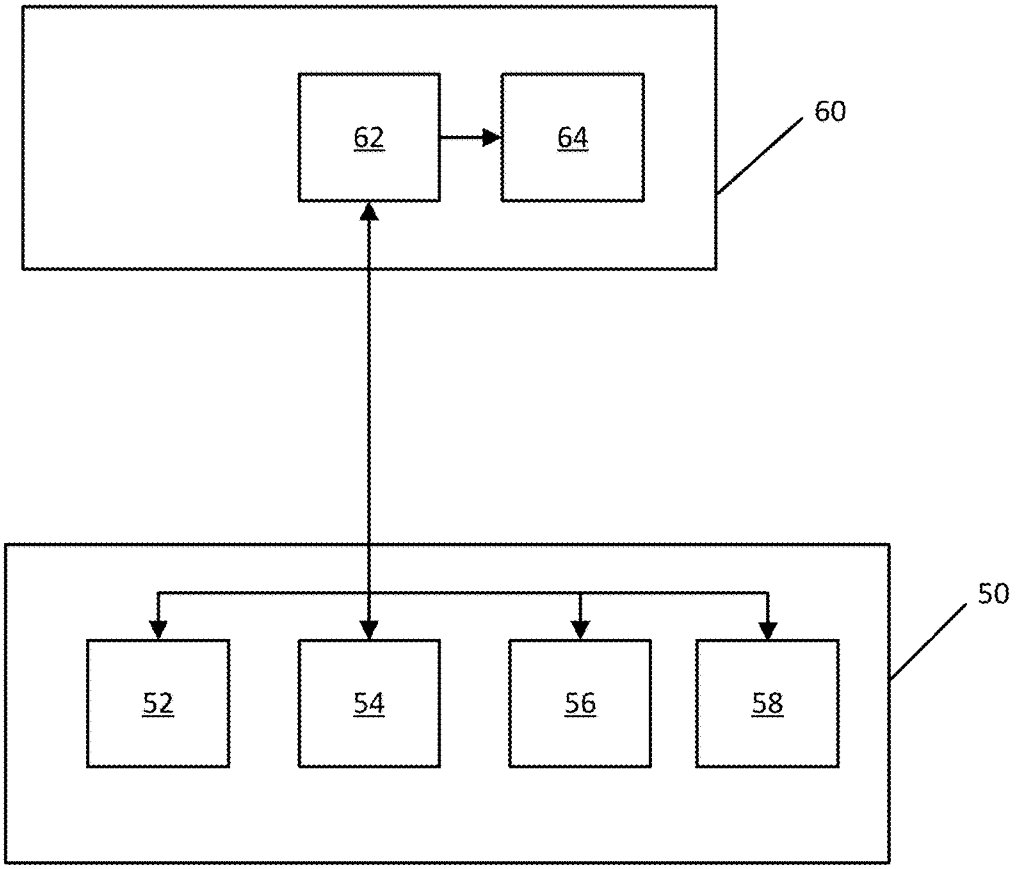
FIG. 1 is a block diagram of the core components of a gaming system.

Referring to the drawings, there is shown a gaming system having a game controller arranged to respond to a start condition by conducting game rounds until either a first or a second end condition is met. In each game round, symbols are selected by the game controller and displayed on a display at a set of display positions. The symbols that are selected can include, first "enemy" symbols and second "hero" symbols. When the game controller selects one or more enemy symbols, these are added to a first symbol display area separate to the display positions, thereby keeping a count of the enemy symbols and enabling the player to view the current total. In embodiments of the invention, there are a plurality of different "enemies" and they are grouped together in the first symbol display area under the control of the game controller with separate counts being displayed for each type of "enemy" so that a player can view both how many different "enemy" symbols have been collected and the total number of enemies collected. If the total number of enemies reaches a threshold number, a first end condition is met and the game ends. If a hero symbol is in the selected symbols, one of the groups of enemies is removed by the game controller. Each time a group of enemy symbols is removed an award may be made. The first symbol display area is updated to reflect the removal of symbols so that the player can readily see the state of the game. If removal of a group of enemy symbols results in the removal of all of the enemy symbols, a second, winning end condition is met resulting in the award of a prize by the game controller.

General Construction of Gaming System

The gaming system can take a number of different physical forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
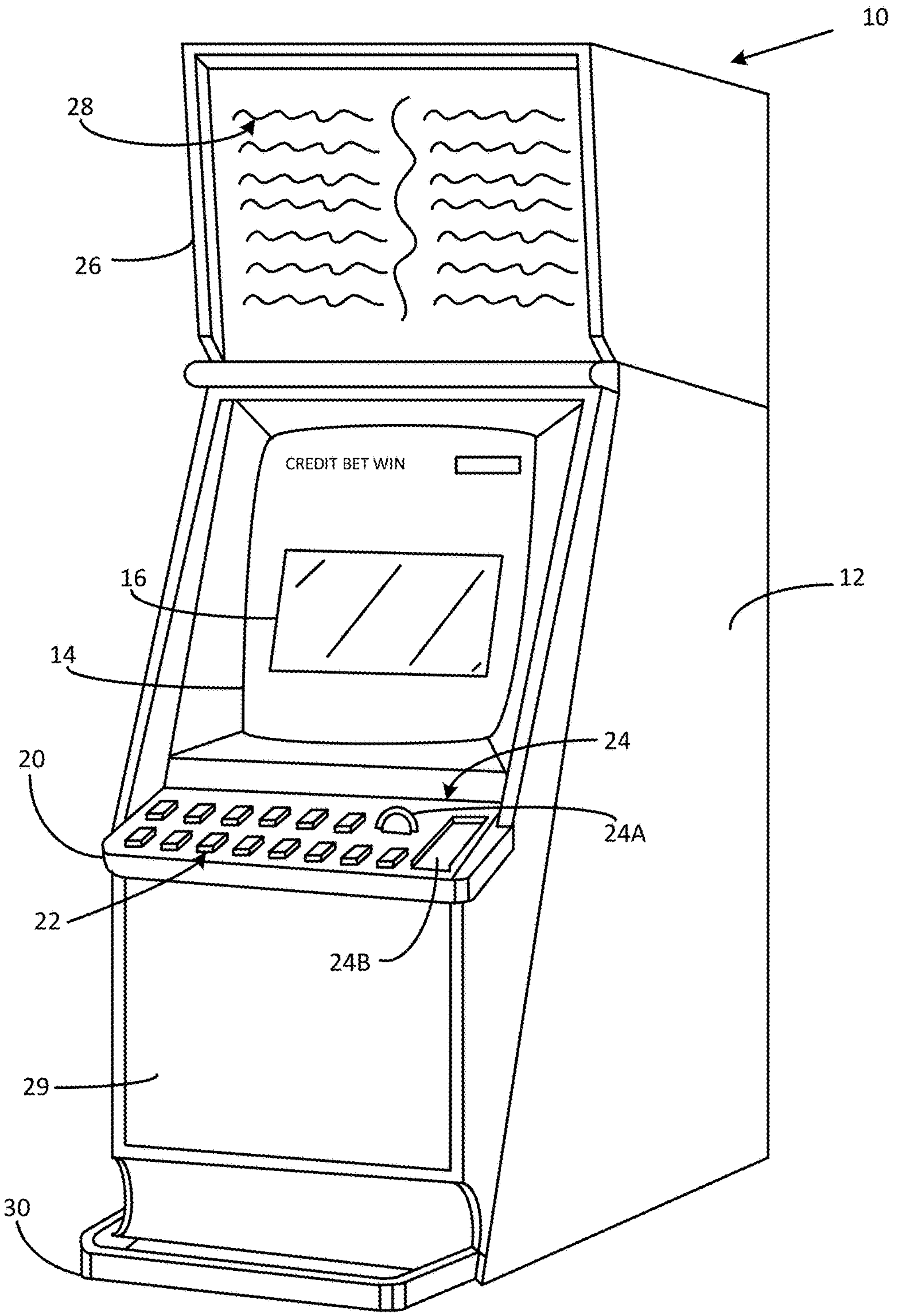
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. In other embodiments, the display may be an OLED, plasma screen, or any other suitable video display unit. The top box 26 may also include a display, which may be of the same type as the display 14, or of a different type.

Figure 3:
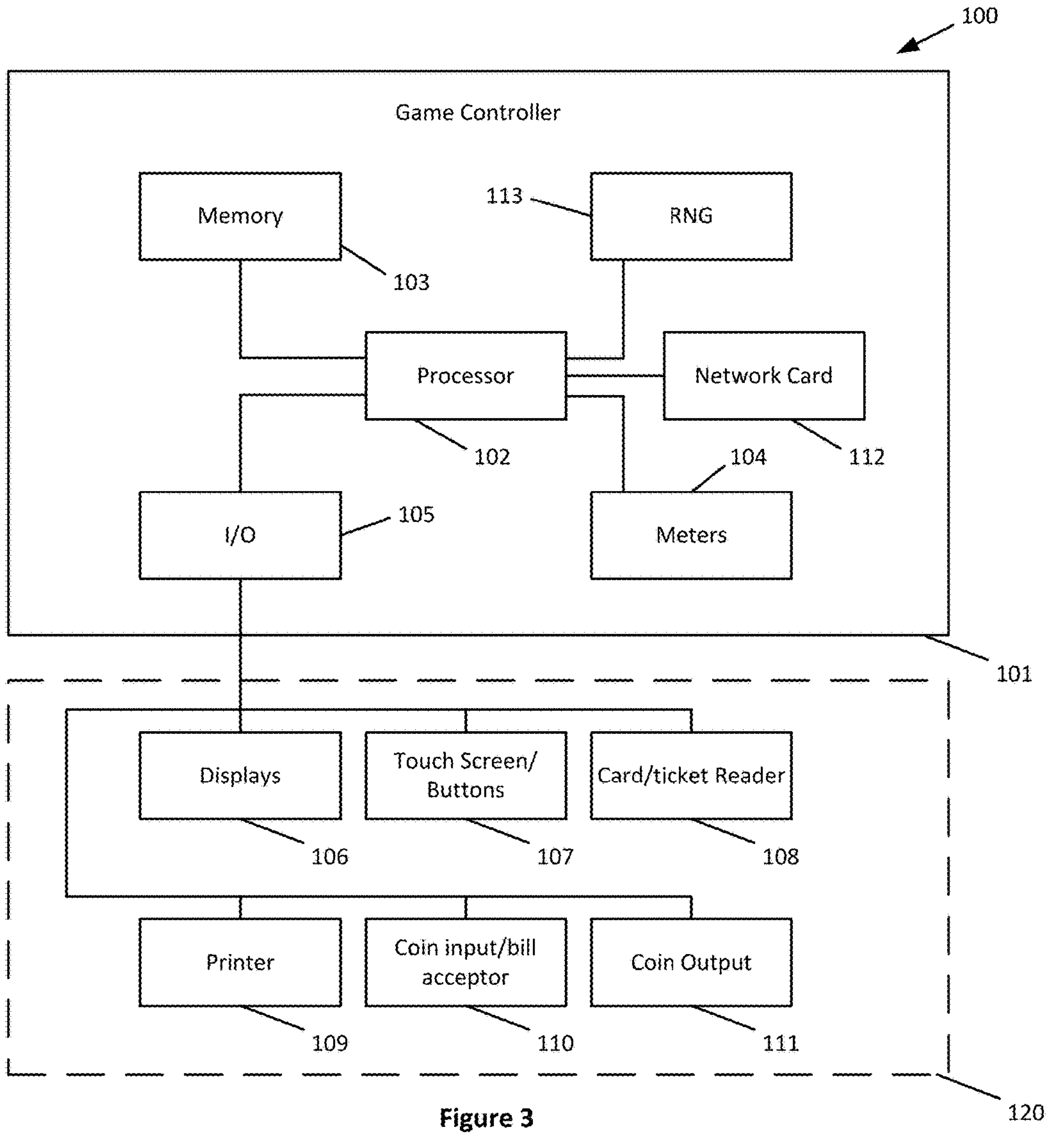
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
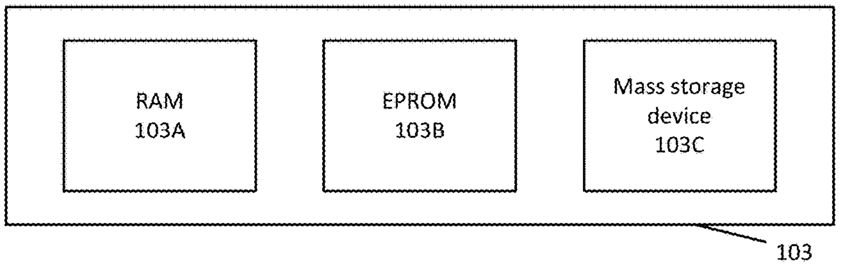
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
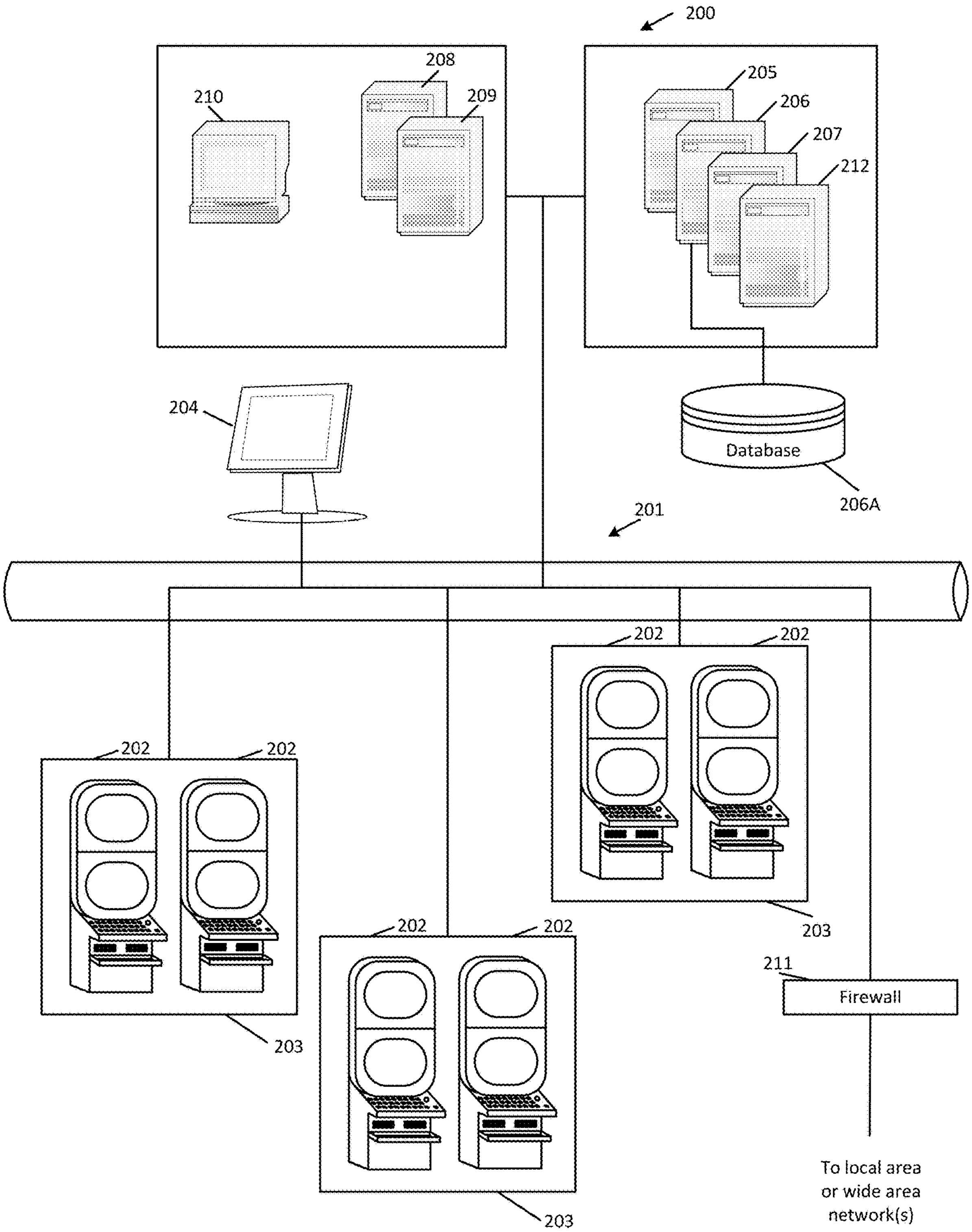
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three, four, five or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
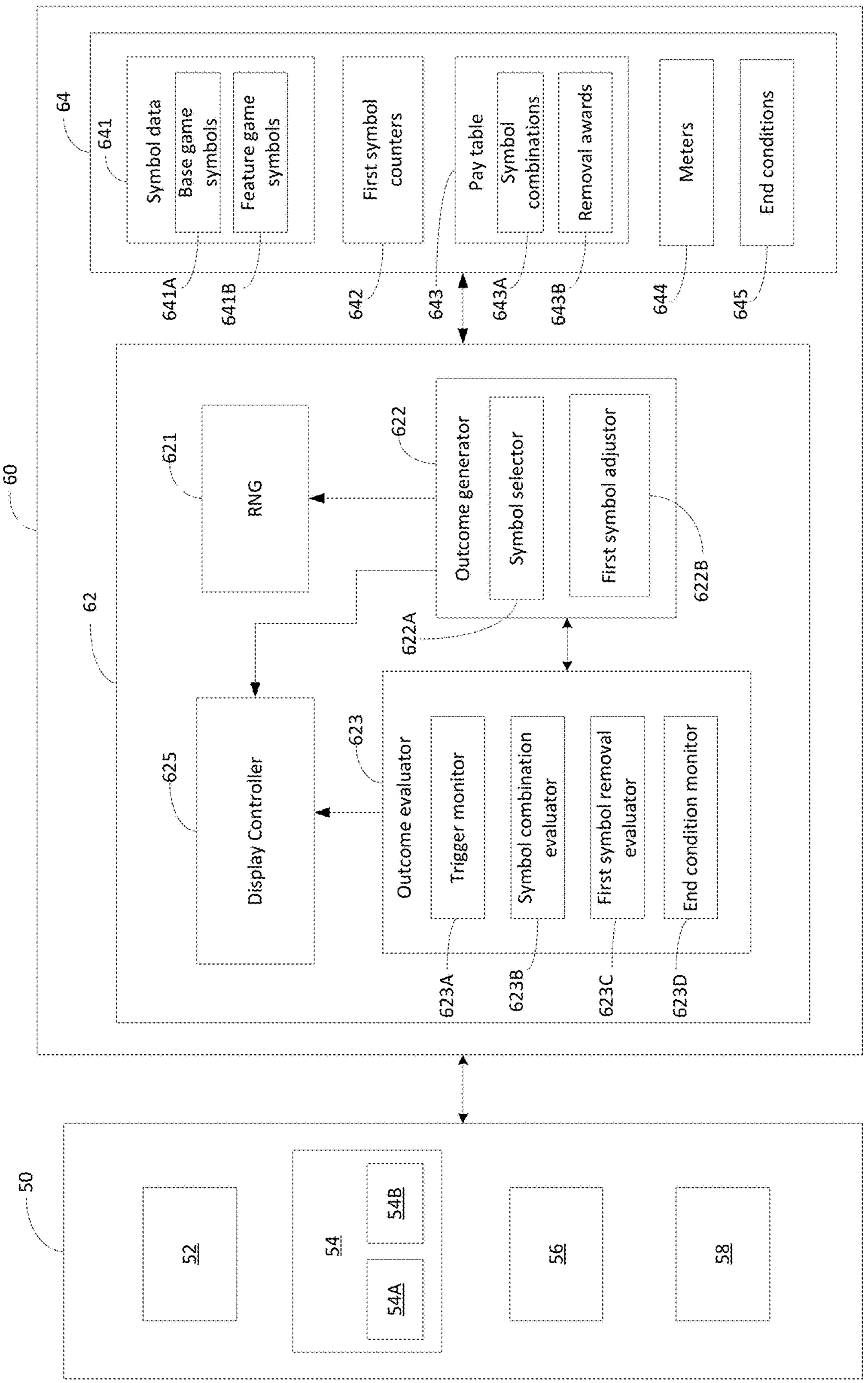
FIG. 6 is a further block diagram of a gaming system.

Referring to FIG. 6, the gaming system 1 has a game play mechanism 56. The player operates the game play mechanism 56 to make a wager on the game. The wager specifies the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. In a spinning reel game, such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of pay lines and are an inherent part of the win entitlement. In some embodiments, there may be an ante bet that the player needs to place which provides the player with the ability to achieve certain wins or changes the manner in which the game controller carries out game play in some manner.

Persons skilled in the art will appreciate that in other embodiments, the player may obtain a win entitlement by selecting a number of reels to play and an amount to wager per reel. Such games are marketed under the trade name “Reel Power” by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

In FIG. 6, the processor 62 of game controller 60 is shown implementing a number of modules based on program code and data stored in memory 64. Persons skilled in the art will appreciate that one or more the modules could be implemented in some other way, for example by a dedicated circuit or by a separate processor.

These modules include the outcome generator 622 which operates in response to the player's operation of game play mechanism 56 to place a wager and initiate a play of the game. In an embodiment, a based game is carried out by the game controller each time the player makes a wager and can result in a feature game if a start condition is met that “triggers” the feature game. Depending on the embodiment, the trigger event may be, a symbol combination in the game, occurrence of a specific symbol in the game, purchased, be caused by another connected system, based on turnover, based on a random evaluation, etc. In one example, the trigger event is the occurrence of three or more scatter symbols in the base game. In some embodiments, an eligibility criteria may be applied by the game controller to determine whether the feature game can be triggered, for example that the player has made a certain sized wager, made an ante bet, selected all win lines, played sufficient games, or the player is a member of a loyalty program.

In an embodiment, the symbol selector 622A of outcome generator 622 selects symbols from a set of base game symbols 641A specified by symbol data 641 using random number generator 621 to form a base game outcome. The selected symbols are communicated to the display controller 625 which causes them to be displayed on display 54 at a set of display positions.

One example of selecting symbols is for the symbol selector 622A to select symbols for display from a plurality of symbol sets corresponding to respective ones of a plurality of spinning reels. In this embodiment, the base symbol set 641A specifies a sequence of symbols for each reel such that the symbol selector 622A can select all of the symbols by selecting a stopping position in the sequence. In one example, three symbols of each of five reels may be displayed such that symbols are displayed in five columns with a total of fifteen display positions on display 54. It is known to use a probability table stored in memory 64 to vary the odds of a particular stop position being selected. Other techniques can be used to control the odds of particular outcomes occurring to thereby control the return to player of the game.

Once the base game symbols 641A are selected, they are evaluated by outcome evaluator 623. In particular, symbol combination evaluator 623B compares the selected symbols with the symbol combinations 643A defined in pay table 643 on the basis of the player's wager to determine whether to make an award and the quantum of any award. Further, the trigger monitor 623A determines whether the selected symbols satisfy a trigger condition. As indicated above, this may be that the selected symbols include a defined number of scatter symbols. In an embodiment, the occurrence of a trigger condition in a base game outcome represents a start condition for conducting free games as a feature game.

In an embodiment, the free games are conducted by the game controller 60 until either a first or a second end condition is met. In other embodiments, there may be additional end conditions 645, for example, a defined number of free games which represents the maximum number of free games that will be conducted before the feature game ends. In some embodiments, different numbers of free games may be awarded by the game controller depending on the nature of the trigger. For example, free games may be awarded in proportion to the number of scatter symbols.

In each game round of the free games, the symbol selector 622A selects symbols in a similar manner to that described in relation to the base game. In an embodiment, the reels used in the feature game may be different to those used in the base game and hence, the symbol selector 622A selects symbols from the feature game symbols 641B. In this respect, it will be appreciated by a person skilled in the art that the individual symbols used to make up the set of reels could be the same and the variance between the symbol set could result from differences in the distribution of the symbols, differences in the numbers of symbols, the number of symbols on the reels, etc. In other embodiments, the symbols that are used may change during the feature game. In other embodiments the reels may be the same for the base and feature games.

In the embodiment, when the feature game is triggered, the display controller 625 of game controller 60 adds a first display area 54B to the display (the reels being displayed in reel display area 54A). In the embodiment, the feature game symbols include a subset of symbols which are designated as first symbols. These symbols can be themed in accordance with the game. In one embodiment, the first symbols are themed as “enemies”. In one example, there may be four different enemies in the set of first symbols. In an embodiment, a defined number of these enemy symbols are added by the first symbol adjustor 622B to the first display area 54B on the display in response to the trigger condition being met as monitored by trigger monitor 623A. In one example, one of each enemy symbol is added to the first display area 54B by the first symbol adjustor 622B. The first symbol display area is arranged so as to be able to display each type of enemy symbol separately so that the player can readily view both the current number of types of enemy symbols and the current total of each type of enemy symbol.

The symbol selector 622A then selects a set of symbols for display in reel display area 54A. In one embodiment, these symbols are evaluated by symbol combination evaluator 623B based on symbol combinations in pay table 643A. In another embodiment, the individual symbol combinations are not evaluated during the feature game. In an embodiment, the first symbol adjustor 622B adjusts the symbols displayed in first symbol display area 54B based on whether the selected symbols include any of the defined first, enemy symbols. The first symbol adjustor adds a first symbol to the first symbol display area 54B for each occurrence of a first symbol in the symbols displayed in symbol display area 54A. For example, if the selected symbols 54A include two first symbols corresponding to a first enemy and one first symbol corresponding to a third enemy (assuming, for this example, four different enemies), the first symbol adjustor adjusts the number of symbols displayed by adding two first enemy symbols and one third enemy symbol to the first symbol display area. The first symbol adjustor 622B, also updates a first symbol counter 642 in memory which defines the number of each type of symbols that have been accumulated.

In the embodiment, the first symbol adjustor 622B updates the first symbol display area 54B so that each of the types of first symbol are grouped together. Thus, if the above outcome were to be the first occasion on which the symbols were adjusted, the first display would show three first enemy symbols, one second enemy symbols, two third enemy symbols, and one fourth enemy symbol—i.e. a total of seven enemy symbols.

In an embodiment, the end condition monitor 623C determines whether the adjusted number of symbols meets a first end condition which is that the addition of first symbols to the first symbol display area 54B has led to a total number of enemy symbols reaching a defined number. For example, that there are sixteen or more first symbols as a result of the generation of the outcome. If so, the series of free games ends and the player is required to place a further wager to initiate a new play of the base game.

In an embodiment, after the end condition monitor 623C determines whether the first end condition is met, the first symbol adjustor 622B determines whether the make an adjustment to the first symbols based on the occurrence of any second symbols in the symbols selected by a symbol selector 622 and displayed in reel display area 54A. In one example, these second symbols are themed as "hero" symbols. Depending on the embodiment, there may be one or more hero symbols. In the embodiment, the occurrence of a hero symbol results in the removal of a group of first symbols. That is in the case where there are four different symbols, the occurrence of a hero symbol will result in removal of all occurrences of one of the first, second, third or fourth enemy symbols. In an embodiment, the first to fourth enemy symbols are allocated a ranking and all symbols of the lowest ranked group of symbols having a non-zero value is removed. In an embodiment, the enemy symbols are displayed in the first symbol area based on their ranking. This also involves the game controller 60 resetting the first symbol counter for that group to zero. Accordingly, assuming the lowest ranked symbol is the first enemy symbol and the highest ranked symbol is the fourth enemy symbol, and at the time the hero symbol occurs there are one or more first enemy symbols all occurrences of the first enemy symbol will be removed from the first symbol display area 54B by the first symbol adjustor 6224. If two hero symbols occur two groups of enemy symbols will be removed by the first symbol adjustor 622B. If a current value of the lowest ranked symbol is zero, the first symbol adjustor 622*b* of game controller 60 removes the next highest ranked group of symbol.

In an embodiment, the outcome evaluator includes a first symbol removal evaluator 623C which determines an amount of a removal award based on removal award data 643B stored in pay table. The removal awards of the embodiment are based on the number of symbols that are removed and their relative value. In an embodiment, higher values are associated with a higher ranked symbol.

The end condition monitor 623D determines whether the adjustment of the symbols caused by the appearance of any hero symbols results in the satisfaction of a second end condition. In an example, this is that there are no more enemy symbols displayed in first symbol display area.

Accordingly, it will be appreciated that in the above example of four different first symbols, at least four hero symbols must occur before all enemy symbols can be removed (and hence all first symbol counters 642 can be reset to zero because all enemy symbols have been removed). Persons skilled in the art will also appreciate that it is possible that after a particular enemy symbol has been removed, the relevant enemy symbol may occur in an outcome of another game round generated by outcome generator 622 resulting in that symbol being added to the first symbol display area by the first symbol adjustor 622B needing to be removed again in order for the second end condition to be met.

In an embodiment, the second end condition, is a winning end condition and results in an additional prize being awarded to a player in addition to the prizes for first symbol removal.

All awards that occur during a free game are transferred to a win meter, stored in meter data 644 and will be transferred to a credit meter at the end of a game.

Persons skilled in the art will appreciate that there can be variations on the above embodiment. For example, in some embodiments, the first symbol adjustor could act on making adjustments based on the appearance of a second symbol before the end condition monitor evaluates whether the first end condition is met.

Figure 7:
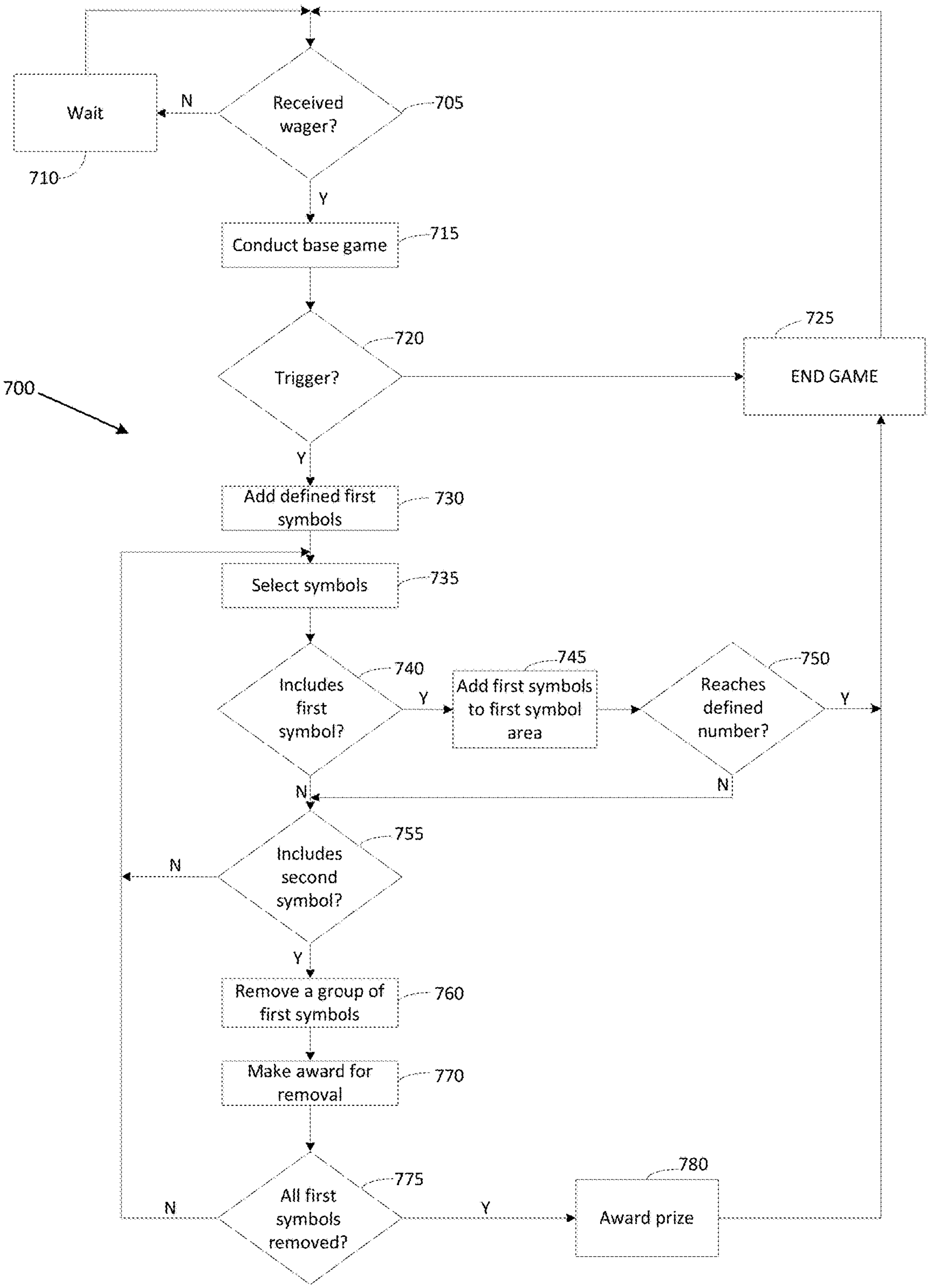
FIG. 7 is a flow chart of an embodiment.

Referring to FIG. 7, there is shown a method 700 as carried out by the game controller of the gaming system.

Initially, the gaming machine is waiting to determine whether it has received a wager 705. If it has not received a wager, the gaming machine returns to a wait state 710. Upon receiving 705 a wager, the game controller conducts 715 a base game and in addition to evaluating whether any winning outcomes have occurred in the base game for which an award is to be made, determines 720 whether a trigger condition is met. Upon a trigger condition being met, the game controller 60 adds the first symbol display area 54B to the display and adds 730 a defined number of first symbols to the first symbol display area. The game controller 60 then selects symbols 735 and determines 740 whether the selected symbols include first symbols. If the selected symbols include first symbols, the game controller adds 745 first symbols to a first symbol display area. The game controller determines 750 whether the number of first symbols has reached a defined number. If it has, it ends 725 the game.

If the game controller determines that the addition of first symbols has not caused the defined number of first symbols to be reached or the outcome of the selection of symbols 735 did not include first symbols, the game controller proceeds to determining 755 whether the selected symbols include one or more second symbols. If not, the game controller reverts to selecting 735*a* further set of symbols. If the selected symbols of a particular game round include one or more second symbols 755, the game controller removes a corresponding number of groups of first symbols 760 from the first symbol display area and makes 770 an award for each removal. After each removal and/or addition of symbols the game controller updates the first symbol display area. The game controller then determines 775 whether a second end condition has been met which is whether all first symbols have been removed. If not, the game controller reverts to selecting a further set of symbols 735. If all the first symbols have been removed, the game controller awards 780 a prize and the game ends 725.

Persons skilled in the art will appreciate that in another embodiment, the start condition for conducting a series of games may be the placement of a particular wager such that no base game is required and there is direct entry to the feature game.

EXAMPLE

In an embodiment, the feature game conducted by the game controller consists of free games which are represented as a battle sequence occurring in the first symbol display area. The first symbol display area 54B may be placed at the top of the screen above the reels. In another embodiment, the first symbol display area may be displayed on a separate display (for example, on a top box) of the gaming system.

In an embodiment, during the free games, a scatter symbol substitutes for all symbols. In an embodiment, the feature game cannot be retriggered during the free game.

In an embodiment, a first symbol (PIC 1) is designated as the "hero" and second to fifth symbols (PIC2, PIC3, PIC4 and PIC5) are designated as "enemies". The enemy symbols are ranked according to a symbol hierarchy with PIC2 being the highest and PIC5 being the lowest. In an embodiment, when the feature game starts, one of each of the enemy symbols is placed on the screen in a first display area above the reels at the start of the feature. In an embodiment, they are placed in an ordered row with a highest valued symbol (PIC2 823) on the far right as shown in FIG. 8.

Figure 8:
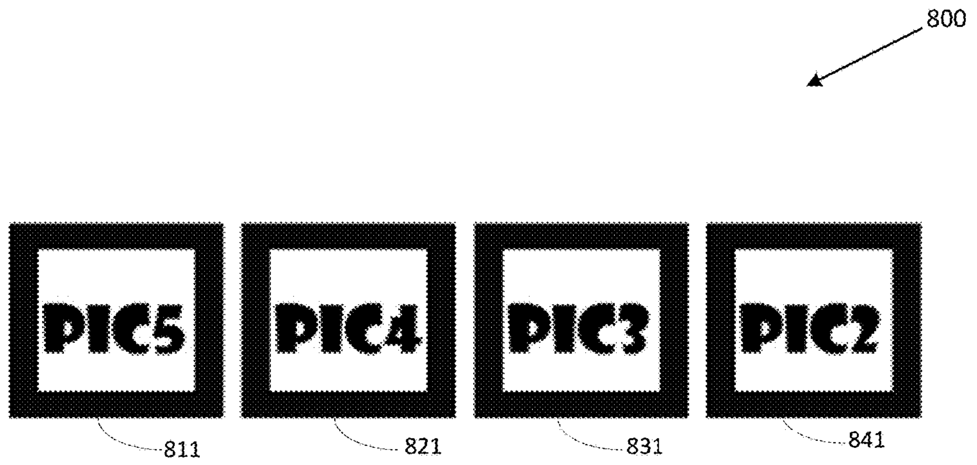
FIG. 8 illustrates the first symbols displayed in a first symbol area in response to a start condition being met.

As shown in FIG. 8, there is an example layout of the first symbol display area 800 immediately after the feature game has triggered. There is one of each of a PIC5 811, PIC4 821, PIC3 831 and PIC2 841. In the displayed order, symbols will be removed from left to right.

If any of the four enemy symbols appear in the feature game, they are placed on top of the screen in the first symbol display area such that the number of enemy symbols grows. If a hero symbol appears in the selected symbols, a battle ensues in which the left most block, or group of symbols is removed for each hero symbol that appeared in the selected symbols. Thus, if two heroes appeared in the selected symbols, the two left most blocks or groups of enemies would be removed. In this case, all PIC5 and PIC4 symbols 811, 821.

For each block of symbols that is removed by the game controller, a prize is awarded in accordance with a battle prize table. The prizes depend on the symbol and the number of the symbol in that removed block.

Figure 9:
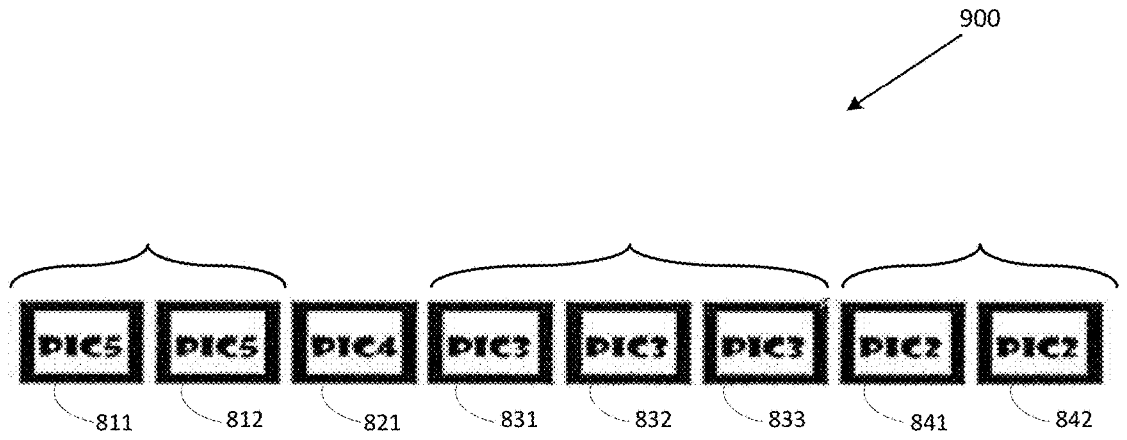
FIG. 9 illustrates a possible state of the first symbol area.

FIG. 9 shows an example of a possible appearance of the first display area 900 during the feature game. It will be apparent that there is a first group comprised of two PIC5 symbols 811, 812, a second group comprised of a single PIC4 symbol 821, a third group consisting of three PIC3 symbols 831-833, and a fourth group consisting of two PIC2 symbols, 841, 842 resulting in a total of eight enemy symbols.

In the example, the feature game continues until all blocks have been removed from the screen by the game controller which is themed as a victory to the hero or, sixteen or more enemies in total are (or would be), in the first symbol display area which is themed as a victory to the villain.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. An electronic method of gaming comprising:

upon a start condition being met, conducting game rounds with a game controller of a gaming system until an end condition is met, wherein each game round comprises the game controller:

selecting symbols from a set of game symbols using a random number generator, the selected symbols being displayed on a display of a gaming system at a set of display positions;

upon the selected symbols including one or more first symbols of a set of first symbols of the game symbols and a second symbol of the game symbols, adding the one or more first symbols that correspond to each included first symbol to a first symbol display area on the display and removing all occurrences of at least one first symbol from the first symbol area, the first symbol display area separate from the set of display positions;

determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and making an award in response to the second end condition being met.

2. A method as claimed in claim 1, wherein the selected symbols are displayed in a plurality of reel display positions.

3. A method as claimed in claim 1, wherein a ranking is assigned to respective first symbols of the set of first symbols, and removing all occurrences of at least one first symbol comprises removing all occurrences of at least a lowest ranked symbol.

4. A method as claimed in claim 1, wherein any first symbols are added to first symbol display area before any first symbol is removed, and wherein it is determined whether the first end condition is met before any first symbol is removed.

5. A method as claimed in any one of claim 1, further comprising making an award upon all occurrences of a symbol being removed, wherein the value of the award is dependent on the number of symbols removed.

6. A method as claimed in any one of claim 1, comprising displaying the first symbol display area and adding a defined number of first symbols to the first symbol display area in response to the start condition being met.

7. A method as claimed in any one of claim 1, wherein the start condition is that a trigger condition is met in a base game implemented by the game controller.

8. A game controller for a gaming system, the game controller configured to:

upon a start condition being met, conduct game rounds until an end condition is met, wherein each game round comprises:

selecting symbols from a set of game symbols using a random number generator, the selected symbols being selected for display on a display of a gaming system at a set of display positions;

upon the selected symbols including one or more first symbols of a set of first symbols of the game symbols and a second symbol of the game symbols, controlling the display to add the one or more first symbols that correspond to each included first symbol to a first symbol display area on the display and removing all occurrences of at least one first symbol from the first symbol area, the first symbol display area separate from the set of display positions;

determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and making an award in response to the second end condition being met.

9. A game controller as claimed in claim 8, further configured to control the display to display the selected symbols in a plurality of reels of display positions.

10. A game controller as claimed in claim 8, wherein a ranking is assigned to respective first symbols of the set of first symbols, and wherein the game controller is further configured to remove all occurrences of at least one first symbol by removing all occurrences of at least a lowest ranked symbol.

11. A game controller as claimed in claim 8, further configured to add any first symbols to the first symbol display area before any first symbol is removed, and wherein the game controller is configured to determine whether the first end condition is met before any first symbol is removed.

12. A game controller as claimed in claim 8, further configured to make an award upon all occurrences of a symbol being removed, wherein the value of the award is dependent on the number of symbols removed.

13. A game controller as claimed in claim 8, further configured to display the first symbol display area and add a defined number of first symbols to the first symbol display area in response to the start condition being met.

14. A game controller as claimed in claim 8, wherein the start condition is that a trigger condition is met in a base game implemented by the game controller.

15. A gaming system configured to, upon a start condition being met, conduct game rounds until an end condition is met, the gaming system comprising:

a display;

a symbol selector for selecting symbols in each game round from a set of game symbols using a random number generator for display on the display;

a first symbol display adjustor for:

upon the selected symbols including one or more first symbols of a set of first symbols of the game symbols and a second symbol of the game symbols, controlling the display to add one or more first symbols that correspond to each included first symbol to a first symbol display area on the display and removing all occurrences of at least one first symbol from the first symbol area, the first symbol display area separate from the set of display positions;

an end condition monitor for determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and an outcome evaluator for making an award in response to the second end condition being met.

16. A gaming system as claimed in claim 15, wherein the selected symbols are displayed in a plurality of reels of display positions.

17. A gaming system as claimed in claim 15, wherein a ranking is assigned to respective first symbols of the set of first symbols, and wherein the first symbol display adjustor is further configured to remove all occurrences of at least one first symbol by removing all occurrences of at least a lowest ranked symbol.

18. A gaming system as claimed in claim 15, wherein the first symbol display adjustor is further configured to add any first symbols to the first symbol display area before any first symbol is removed, and wherein the end condition monitor is configured to determine whether the first end condition is met before any first symbol is removed.

19. A gaming system as claimed in claim 15, wherein the outcome evaluator is further configured to make an award upon all occurrences of a symbol being removed, wherein the value of the award is dependent on the number of symbols removed.

20. A gaming system as claimed in claim 15, comprising a display controller configured to display the first symbol display area and wherein the first symbol display adjustor is configured add a defined number of first symbols to the first symbol display area in response to the start condition being met.

21. A gaming system as claimed in claim 15, wherein the start condition is that a trigger condition is met in a base game implemented by the gaming system.

22. A gaming system comprising:

display means;

means for, upon a start condition being met, conducting game rounds with a game controller of a gaming system until an end condition is met;

means for selecting symbols from a set of game symbols for each game round using a random number generator, the selected symbols being displayed on a display of a gaming system at a set of display positions;

means for upon the selected symbols including one or more first symbols of a set of first symbols of the game symbols and a second symbol of the game symbols, adding a one or more first symbols that correspond to each included first symbol to a first symbol display area on the display and removing all occurrences of at least one first symbol from the first symbol area, the first symbol display area separate from the set of display positions;

means for upon the selected symbols including a second symbol of the game symbols, removing all occurrences of at least one first symbol from the first symbol area;

means for determining whether a first end condition or a second end condition is met, the first end condition being that the combined total of first symbols in the first symbol display area reaches a defined number, and the second end condition being that removing all occurrences of at least one first symbol from the first symbol area results in no first symbols being in the first symbol area; and means for making an award in response to the second end condition being met.

23. An electronic method of gaming comprising:

upon a start condition being met, conducting game rounds with a game controller of a gaming system until an end condition is met, wherein each game round comprises the game controller:

selecting symbols from a set of game symbols using a random number generator, the selected symbols being displayed on a display of the gaming system at a set of display positions;

evaluating the selected symbols in order to determine whether to alter one or more of a plurality of counters maintained by the gaming system, wherein each counter is associated with at least one first symbol of a set of first symbols of the set of game symbols, the evaluation being performed by:

increasing each counter by a number of first symbols associated with the respective counter contained in the selected symbols; and resetting at least one counter of the plurality of counters to zero upon at least one second symbol being contained in the selected symbols;

determining whether a first end condition or a second end condition is met, the first end condition being that a combined total of the counters reaches a first defined number, and the second end condition being that resetting the at least one counter to zero results in the combined total of the counters being zero; and making an award in response to the second end condition being met.

* * * * *